(12) United States Patent
Gustavsson et al.

(10) Patent No.: US 8,130,953 B2
(45) Date of Patent: Mar. 6, 2012

(54) SECURITY PROTECTION FOR DATA COMMUNICATION

(75) Inventors: Carl Gustavsson, Lund (SE); Gustaf Lööf, Lund (SE); Stefan Andersson, Klågerup (SE); Stefan Dahl, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 886 days.

(21) Appl. No.: 10/506,943

(22) PCT Filed: Feb. 14, 2003

(86) PCT No.: PCT/EP03/01474
§ 371 (c)(1),
(2), (4) Date: Mar. 7, 2005

(87) PCT Pub. No.: WO03/077581
PCT Pub. Date: Sep. 18, 2003

(65) Prior Publication Data
US 2005/0147249 A1     Jul. 7, 2005

Related U.S. Application Data

(60) Provisional application No. 60/390,193, filed on Jun. 20, 2002.

(30) Foreign Application Priority Data

Mar. 8, 2002   (EP) .................................. 02005419
Jun. 13, 2002  (EP) .................................. 02013071

(51) Int. Cl.
*H04K 1/00* (2006.01)
(52) U.S. Cl. ........ 380/247; 713/168; 713/169; 713/170; 713/171; 726/4; 726/14

(58) Field of Classification Search .................. 380/247
See application file for complete search history.

(56) References Cited

U.S. PATENT DOCUMENTS

| | | | |
|---|---|---|---|
| 6,202,081 B1 * | 3/2001 | Naudus | 709/200 |
| 6,353,891 B1 * | 3/2002 | Borella et al. | 726/12 |
| 6,556,820 B1 * | 4/2003 | Le et al. | 455/411 |
| 6,961,857 B1 * | 11/2005 | Floryanzia | 726/14 |
| 7,010,689 B1 * | 3/2006 | Matyas et al. | 713/168 |
| 7,107,620 B2 * | 9/2006 | Haverinen et al. | 726/29 |
| 7,158,776 B1 * | 1/2007 | Estes et al. | 455/411 |
| 7,171,685 B2 * | 1/2007 | Batra et al. | 726/14 |
| 7,231,661 B1 * | 6/2007 | Villavicencio et al. | 726/4 |
| 7,542,569 B1 * | 6/2009 | Leiwo | 380/247 |
| 2002/0091933 A1 * | 7/2002 | Quick et al. | 713/182 |

(Continued)

OTHER PUBLICATIONS

"SyncML Sync Protocol, Version 1.0," SyncML Consortium, Dec. 7, 2000, Version 1.0.*

(Continued)

*Primary Examiner* — Luu Pham
(74) *Attorney, Agent, or Firm* — Myers Bigel Sibley & Sajovec (57) ABSTRACT

Authentication of an electronic communication apparatus capable of communicating data messages with a server according to a synchronization protocol includes providing an authentication method indicator that specifies an authentication method according to which the authentication is to be executed. The authentication method indicator is incorporated into a message that includes a plurality of authentication capabilities of the communication apparatus. The message is transmitted to the server according to an authentication protocol of the synchronization protocol.

10 Claims, 5 Drawing Sheets

U.S. PATENT DOCUMENTS

| | | | |
|---|---|---|---|
| 2002/0169988 A1* | 11/2002 | Vandergeest et al. | 713/201 |
| 2003/0004937 A1* | 1/2003 | Salmenkaita et al. | 707/3 |
| 2003/0028805 A1* | 2/2003 | Lahteenmaki | 713/201 |
| 2003/0033524 A1* | 2/2003 | Tran et al. | 713/168 |
| 2003/0041244 A1* | 2/2003 | Buttyan et al. | 713/172 |
| 2003/0056100 A1* | 3/2003 | Beatson | 713/176 |
| 2003/0081557 A1* | 5/2003 | Mettala et al. | 370/252 |
| 2003/0097592 A1* | 5/2003 | Adusumilli | 713/201 |
| 2003/0101246 A1* | 5/2003 | Lahti | 709/221 |
| 2003/0105954 A1* | 6/2003 | Immonen et al. | 713/156 |
| 2003/0166397 A1* | 9/2003 | Aura | 455/410 |
| 2004/0029569 A1* | 2/2004 | Khan et al. | 455/414.1 |

OTHER PUBLICATIONS

W. Simpson, "Request for Comment: 1548," Network Working Group, Dec. 1993, pp. 1-54.*

W. Simpson, "Request for Comment: 1994," Network Working Group, Aug. 1996, pp. 1-14.*

L. Blunk et al., "Request for Comment: 2284," Network Working Group, Mar. 1998, pp. 1-16.*

Olle Kallstrom, "Business Solutions for Mobile E-Commerce," Erricsson Review No. 2, 2000, pp. 80-92.*

Mink et al., "Towards Secure Mobility Support for IP Networks," IEEE, 2000, pp. 555-562.*

Zao et al., "A public-key based Secure Mobile IP" Wireless Network, May 1999, pp. 373-390.*

Boman et al., "UMTS Security," Electronic & Communication Engineering Journal, Oct. 2002, pp. 194-204.*

"SyncML Sync Protocol," SyncML Consortium, Dec. 7, 2000, Version 1.0.

"SyncML Device Management Security," SyncML Consortium, Feb. 15, 2002, Version 1.1.

* cited by examiner

|  | SyncML/ Http/X | SyncML/ WSP/X | SyncML/ Obex/Cable or IrDa | SyncML/ Obex/ BT |
| --- | --- | --- | --- | --- |
| SyncML layer | Client [+ server] authenti-cation | Client [+ server] authenti-cation | Client + server authenti-cation | Client + server authenti-cation + Integrity protection |
| Transport layer | Server authenti-cated TLS | Server authenti-cated WTLS, i.e. c 2 | No require-ments | No require-ments |
| Bearer layer | No require-ments | No require-ments | No require-ments | BT ciphering and authenti-cation |

Table 1

SECURITY PROTECTION FOR DATA COMMUNICATION

RELATED APPLICATIONS

The present application is a 35 U.S.C. §371 national phase application of PCT International Application No. PCT/EP03/01474, having an international filing date of Feb. 14, 2003 and claiming priority to European Patent Application No. 02005419.3, filed Mar. 8, 2002, European Patent Application No. 02013071.2 filed Jun. 13, 2002, and U.S. Provisional Application No. 60/390,193, filed Jun. 20, 2002, the disclosures of which are incorporated herein by reference in their entireties. The above PCT International Application was published in the English language and has International Publication No. WO 03/077581 A1.

FIELD OF THE INVENTION

The present invention relates to protocols for communication of data messages between electronic apparatuses. More particularly, the present invention relates to a method for providing authentication and integrity protection when a synchronization protocol for data communication is utilized for communication of data between e.g. a client and a server. Also, the present invention relates to a server and client adapted to provide authentication and integrity protection according to the method of the invention.

DESCRIPTION OF THE RELATED ART

In some situations it is preferred to communicate data between a client and a server using a standardized synchronization protocol. By utilizing the synchronization protocol it is possible to provide data communication between electronic apparatuses from different manufacturers. With the SyncML initiative a standardized data synchronization protocol is provided, which facilitates communication of data between user apparatuses of different manufacturers. Examples of a client as disclosed above is an electronic communication apparatus such as a mobile telephone, a pager, an electronic organizer, a smartphone or the like.

One example of a situation where this possibility is useful is when a device management session is to be established between an apparatus and a server using a synchronization protocol such as e.g. SyncML (SyncML-DM (SyncML-Device Management) or SyncML-DS (SyncML-Data Synchronization)). If there are any problems with the apparatus it can be connected to the server through a wire or wireless communication link. By connecting the apparatus to the server, a remote repairer can get access to the apparatus through the connection. However, the repairer may want to authenticate the apparatus before he/she starts repairing the apparatus. Also, in another situation the apparatus may need to verify an authentication made by a repairer to avoid unauthorized access to the user apparatus by a third party, such as a hacker.

Further, in many situations it is also preferred to provide integrity protection of the data sent between the communication apparatus and the server.

In the SyncML-DM specification the following security mechanisms are specified:
Server authentication
Client authentication
Integrity protection
(Confidentiality)

Figure 3:
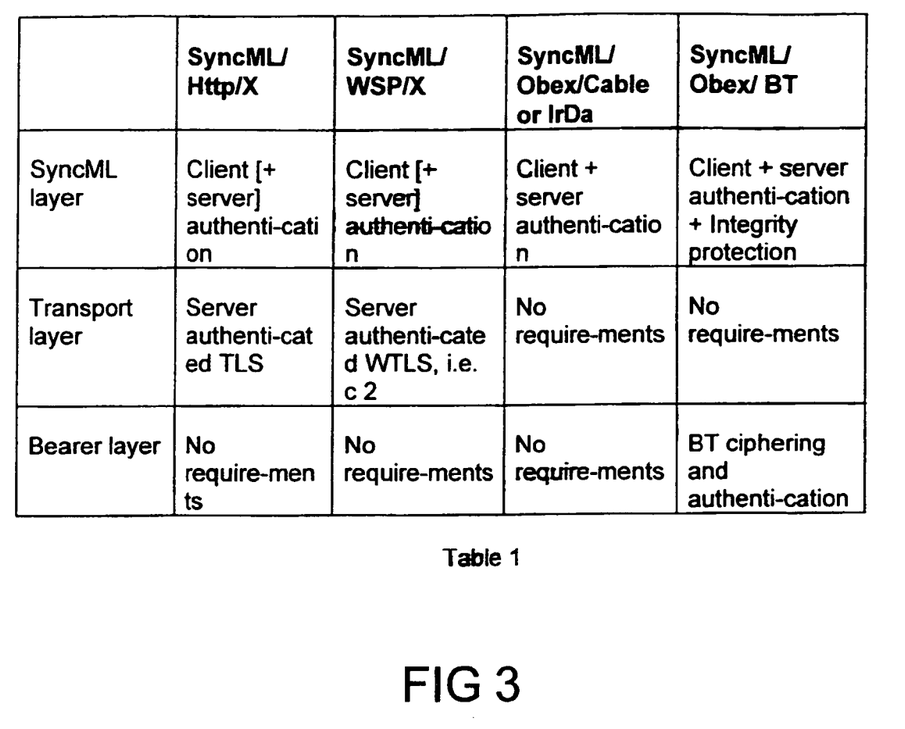
FIG. 3 is a table showing security mechanisms per protocol layer.

In the known art-security protection, i.e. said security mechanisms, is based on the use of a combination of transport level and SyncML level security as indicated in Table 1 of FIG. 3, which shows security mechanisms per protocol layer. As should be noted, confidentiality is mentioned in the Sync ML specification. However, it is not a requirement for the SyncML-DM.

From table 1 of FIG. 3 it can be concluded that there are strong requirements for client authentication and integrity protection at SyncML level since there are scenarios where there are no alternatives, such as with a SyncML protocol combined with an Obex transport protocol and a Cable or IrDa bearer layer. Also, server authentication and confidentiality are useful but not essential.

Presently, the SyncML specification specifies an authentication protocol that can be used for both client and server authentication.

The main problem with SyncML security is that it is based on a combination of username and password. This has two major disadvantages as it gives weak security and it forces the user to handle yet another password. Also, it is difficult to generate good integrity protection keys from a password, as the entropy of a password is too small. 40-128 random bits is normal for generating a good integrity key. Using a password, this would require 50-70 symbols in a password typed on a keyboard to derive a sufficiently amount of random bits.

SUMMARY OF THE INVENTION

It is an object of the invention to provide a flexible method for providing at least client authentication, when a synchronization protocol such as SyncML-DM/DS is utilized for communicating messages between the client and a server. More specifically, it is an object of the invention to provide client authentication in a more flexible manner than previously known wherein neither username nor password is necessary. Yet another object is to execute client authentication based on the specific authentication capabilities of the client. Also, it is an object of the invention to provide integrity protection, in addition authentication, using good integrity protection keys. It is preferred to render possible the use of a number of different known authentication methods to be used with the synchronization protocol. Finally, it is an object of the invention to also provide server authentication in addition to client authentication and integrity protection.

The above objects are achieved in that an authentication protocol of the synchronization protocol is utilized for providing an authentication method indicator (AMI). The AMI are incorporated in a meta command of the synchronization protocol for indicating the specific type of authentication method used in each particular case. The authentication method may be preset, or individually determined by the server based on an initialization message sent by the apparatus for indicating e.g. its authentication capabilities, and establishing a connection. Any data relating to the determined authentication method are incorporated in a data string of the protocol when messages are communicated.

According to the invention, it is a further object to provide a client, such as an electronic communication apparatus, adapted to provide at least client authentication when the synchronization protocol is used for communicating messages to the server.

According to the invention, the above objects are achieved by an electronic communication apparatus adapted to indicate e.g. its authentication capabilities to the server in an initialization message. Further, the apparatus is adapted to execute authentication according to the authentication technique indicated by the AMI of a message received from the server. Also, the apparatus is adapted to generate a response to the message to be transmitted to the server. For providing integrity protection, the apparatus is adapted to generate good integrity protection keys according to the indicated method.

A further object of the invention is to provide a server adapted to provide at least client authentication using any of a number of known authentication techniques based on the authentication capabilities of the apparatus.

The above objects are achieved by a server adapted to receive the initialization message (for client authentication) or send an initialization message (for server authentication). The server is adapted to determine the specific authentication method to be used based on the authentication capabilities of the apparatus. Further, the server is adapted to execute authentication according to the determined authentication method or according to a preset authentication method, which is incorporated in the AMI of the message. Also, the server is adapted to incorporate any authentication data relating to the specified authentication method in a data string of the message. To provide integrity protection, the server is adapted to generate an IK according to the authentication method/scheme used.

A further aspect of the invention is to utilize good integrity keys (IK) generated by the server and client, respectively, which will provide integrity protection in addition to authentication. The integrity key is generated according to the authentication scheme used or separately by the server or the client. The authentication method/scheme may be GSM SIM, UMTS USIM, SecureId, Safeword, WPKI, WIM, etc. Further, USIM authentication have the advantage of providing mutual authentication, i.e. server authentication and client authentication in addition to integrity protection.

The method according to the invention has the advantage of being flexible, as more than one authentication method may be used when the SyncML-DM/DS protocol is utilized for transmitting data messages between the apparatus and the server. Also, now user name or user identity is necessary for carrying out client and/or server authentication. Further, good integrity keys may be derived from the authentication scheme to provide integrity protection independently from any user name or user id. By utilizing the method of the invention, anti-replay protection may be provided without the need for synchronized counters in both client and server.

Further preferred features of the invention are defined in the dependent claims.

It should be emphasized that the term "comprises/comprising" when used in this specification is taken to specify the presence of stated features, integers, steps, components or groups thereof.

BRIEF DESCRIPTION OF THE DRAWINGS

Preferred embodiments of the present invention will now be described in more detail with reference to the accompanying drawings, in which.

DETAILED DESCRIPTION OF EMBODIMENTS

The present invention provides a method for client authentication and integrity protection of communicated data between e.g. a client, such as an electronic user apparatus, and a server when a standardized synchronization protocol such as SyncML-DM/DS is used.

A mobile telephone 1 is an example of an electronic user apparatus. For convenience, reference will therefore be made to a mobile telephone 1 throughout this description. However, this is only for exemplifying purposes and is not considered to limit the scope of the invention.

Figure 1:
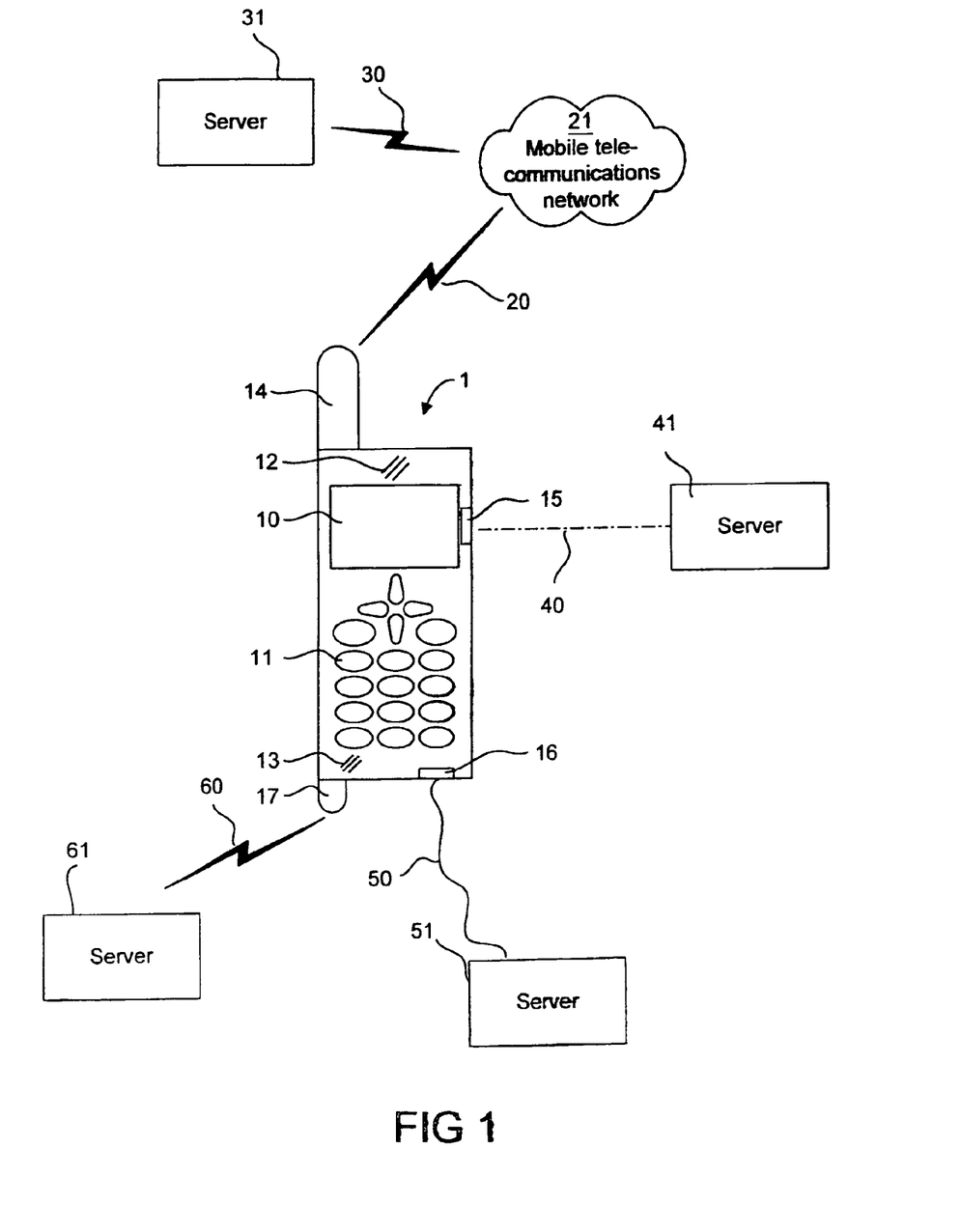
FIG. 1 shows a mobile telephone connected to a number of servers, which are adapted to provide authentication according to the invention.

An exemplary mobile telephone 1 comprising in a normal fashion a display 10, a keypad 11, a loudspeaker 12, and a microphone 13 is shown in FIG. 1. The components together form a man-machine interface, through which a user of the mobile telephone 1 may interact with and operate the mobile telephone 1. Further, the mobile telephone 1 comprises an antenna 14 for establishing a wireless communication link 20 with a mobile telecommunication network 21. The mobile telecommunication network 21 may e.g. be a GSM network ("Global System for Mobile communications") or a UMTS network ("Universal Mobile Telephone System"). The mobile telephone 1 is adapted to communicate data through the mobile telecommunication network 21 using a standardized synchronization protocol such as SyncML-DM/DS. Data can be communicated through a wire based or wireless connection 30 between the mobile telephone 1 and a server 31 connected to the telecommunication network 21.

Moreover, the mobile telephone 1 of the embodiment shown in FIG. 1 comprises an infrared interface 15, such as an IrDA port, by means of which the mobile telephone 1 may be connected through a infrared link 40 to a second server 41 for communicating data using a synchronization protocol, such as SyncML-DM/DS.

The mobile telephone 1 also comprises a system or accessories connector 16, by means of which the mobile telephone 1 may be connected, through e.g. a serial cable 50, to a third server 51, for communicating data using a synchronization protocol, such as SyncML-DM/DS.

Additionally, the mobile telephone 1 comprises a second antenna 17 for establishing a short-range radio link 60, such as a Bluetooth link, to a fourth server 61, for communicating data using a synchronization protocol.

As is understood, not all mobile telephones 1 of the invention have all the above mentioned communication possibilities for communicating data, but can have one or more in different embodiments. Also, the server may be embodied as a pc (personal computer), or another electronic user apparatus adapted to communicate data according to: a synchronization protocol, such as SyncML-DM/DS.

At SyncML level of data transmission between the mobile telephone 1 and the server 31, 41, 51, 61 authentication is provided by utilizing the SyncML-DM/DS protocol for carrying information of the authentication method to be used, such as SIM/USIM authentication, which will be further disclosed below. According to the invention, a number of different authentication methods may be utilized when the SyncML-DM/DS protocol is used for communicating messages. The authentication method to be used is specified according to the same principals as in the existing SyncML-DM/DS authentication protocol, although in a much more flexible manner. For signaling the authentication method being used an authentication indicator (AMI), sometimes referred to as the mechanism, is provided when the SyncML-DM/DS protocol is utilized. The AMI substitutes the authentication directive of the meta command of the conventional SyncML-DM/DS protocol when data is communicated according to the SyncML-DM/DS protocol. Further, any data relating to the specific authentication method utilized is incorporated in a data string of the message sent according to the SyncML-DM/DS protocol.

In one embodiment of the invention GSM SIM or UMTS USIM authentication and integrity protection is utilized This provides authentication of the mobile telephone 1 and integrity protection of data sent between said telephone 1 and the server 31, 41, 51, 61. Also, USIM authentication provides the additional possibility of server authentication. As should be noticed, other authentication techniques are equally well possible, such as PKI based schemes, e.g. WPKI and WIM, and proprietary authentication token technology, e.g. SecureId or Safeword as the authentication method.

The AMI is a variable indicating the algorithm(s) used to produce the message digest of the message being sent using the SyncML-DM/DS protocol, and the specific authentication method, which is to be specified. The value of the AMI depends on the authentication method used. As is indicated above, the mobile telephone 1 may be adapted to execute authentication according to one or more authentication methods.

In the following, an exemplary embodiment according to the invention will be presented, wherein the message flow between the mobile telephone 1 and the server 31, 41, 51, 61 is disclosed. In the exemplary embodiment, SIM/USIM authentication and integrity protection will be described with reference to FIGS. 2, 4, and 5.

Figure 2:
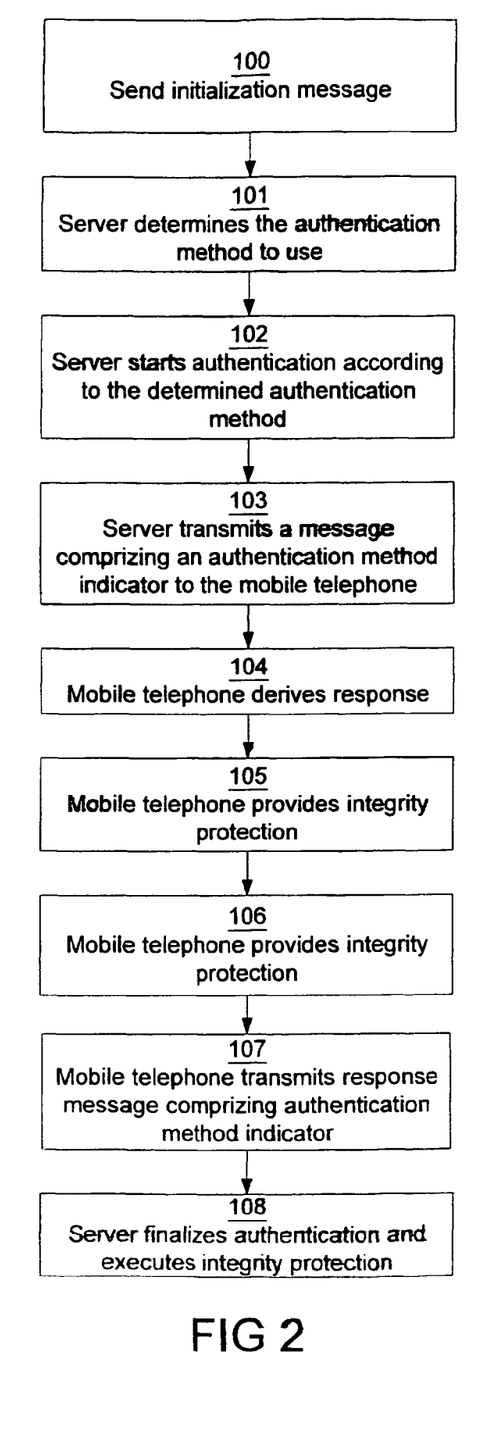
FIG. 2 is a flow chart of an exemplifying authentication process according to the invention.
Figure 4:
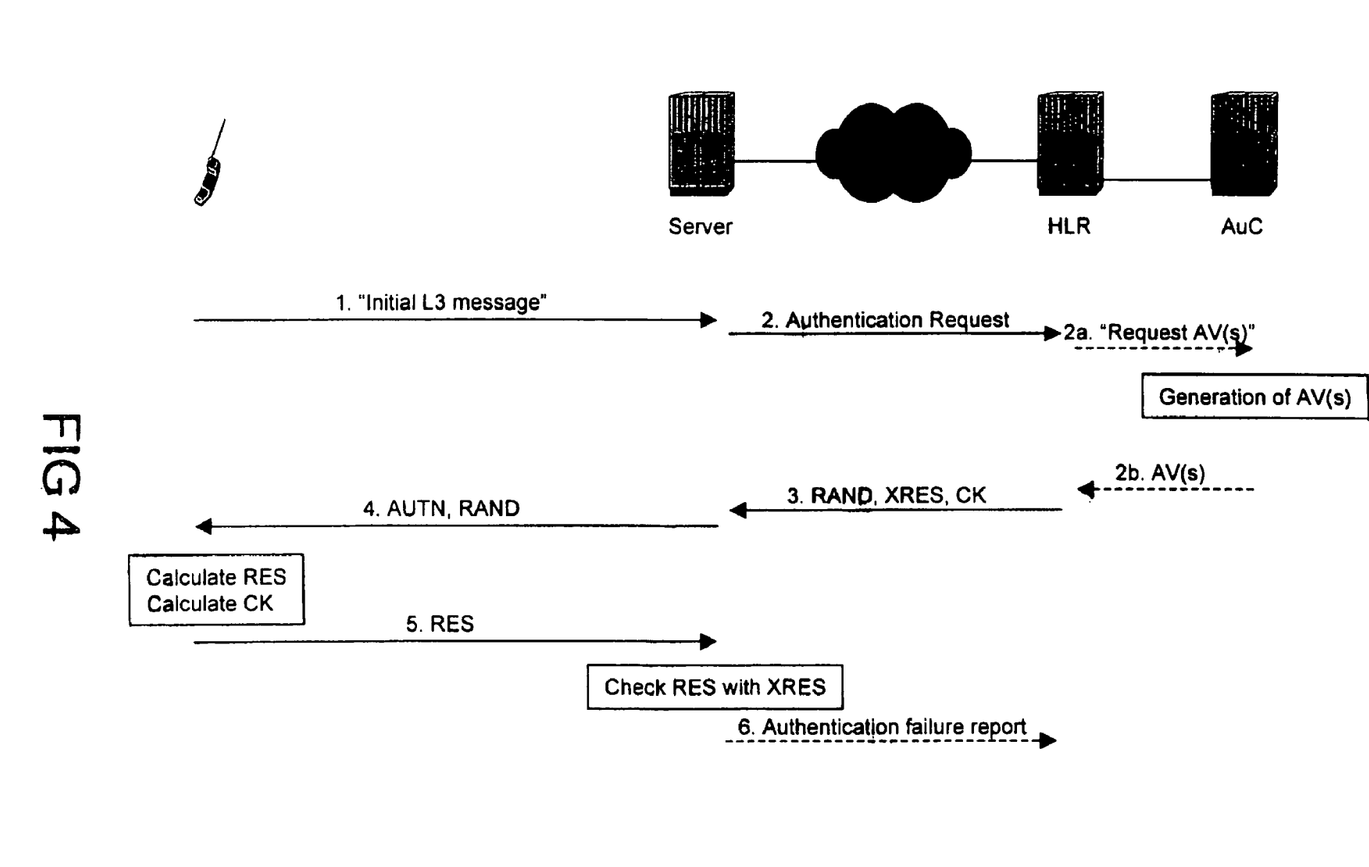
FIG. 4 illustrates variables and the message flow between an electronic user equipment and a server in a SIM authentication scenario.
Figure 5:
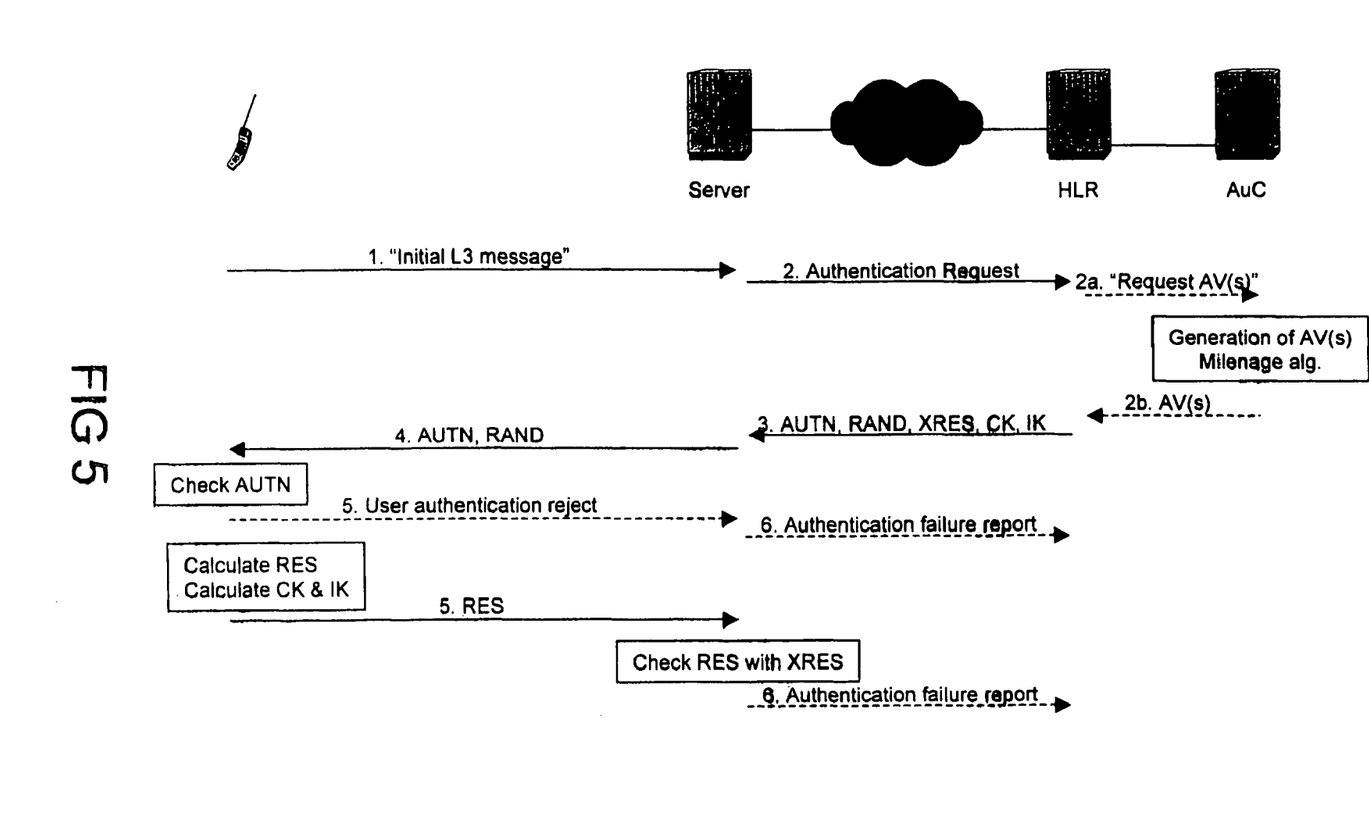
FIG. 5 illustrates variables and the message flow between an electronic user equipment and a server in a USIM authentication scenario.

At a first step 100 of FIG. 2, an initializing message, indicated as "Initial L3 message" in FIGS. 4 and 5, is sent from the mobile telephone 1 to the server 31, 41, 51, 61. The general purpose of the initialization message is to establish a connection between the mobile telephone 1 and the server 31, 41, 51, 61. Also, said message may comprise other information, such as information of the type of device that sent the initialization message, and the identity of the mobile telephone 1 such as IMSI (international mobile subscriber identity) and Ki (subscriber authentication key). The AMI, or a list of AMIs for indicating more than one authentication capability, can be incorporated in the initialization message for indicating the authentication capabilities of the mobile telephone 1. As should be noted, the server 31, 41, 51, 61 may also initiate the establishing of a connection between said server and the mobile telephone 1. This is executed in that the server 31, 41, 51, 61 transmits a server initialization message to the mobile telephone 1, whereupon said telephone 1 transmits the initialization message when the server initialization message is received.

Depending on e.g. the type of device sending the first message, type of data bearer and transport protocol the server 31, 41, 51, 61 determines at step 101 the security level and type of security mechanism, such as SIM/USIM authentication, to be used. However, the security mechanism may equally well be preset, wherein the server 31, 41, 51, 61 does not need to determine the authentication capabilities of the mobile telephone 1. In this embodiment, the server 31, 41, 51, 61 determines that the mobile telephone 1 capable of performing SIM/USIM authentication sent the message. Therefore, the server 31, 41, 51, 61 starts SIM/USIM authentication at 102 by transmitting an authentication request comprising the subscriber identity (IMSI, Ki) to an AUC (authentication center) for deriving authentication variables (AVs), possible via a home location register (HLR). Based on the IMSI, the AUC generates authentication data, such as a challenge, which in this embodiment is a random number, or obtains a stored challenge based on the IMSI. Also, the AUC generates an XRES (expected result), based on the challenge and the Ki, or obtains a stored XRES by means of the IMSI. The XRES will be used in a later step for finalizing the authentication.

In an alternative embodiment, the AUC also generates an CK/IK (cipher key/integrity key) based on the Ki and the challenge, which can be stored together with the XRES and the authentication data at the AUC and/or the server 31, 41, 51, 61 and utilized for integrity protection.

At step 103, the authentication data, XRES and CK/IK are then transmitted to the server, which is adapted to transmit the authentication data to the mobile telephone 1 in the data string of the message according to the SyncML-DM/DS protocol. Also, the value of the AMI, indicating the type of security mechanism used for generating the authentication data, XRES and CK/IK for authentication and integrity protection, i.e. SIM/USIM authentication in this embodiment, is incorporated into the message sent to the mobile telephone 1, as disclosed above.

After receiving the AMI and the authentication data the mobile telephone determines the authentication method to be used by evaluating the AMI and performs the steps necessary according to the specific authentication method to create a response to be sent to the server 31, 41, 51, 61. Alternatively, the authentication method may be predetermined. As the steps necessary for executing SIM/USIM authentication at the mobile telephone 1 form no essential part of the invention per se, it will only be disclosed briefly in the following.

In the exemplifying embodiment, the mobile telephone 1, at step 104, generates a response by transmitting the authentication data to the SIM/USIM of the mobile telephone 1. The SIM/USIM generates, based on the Ki of the subscription stored on the SIM/USIM and the authentication data, a response corresponding to the XRES stored in the server.

In an alternative embodiment, integrity protection is also provided at step 105 if required. Therefore a shared secret key is required. In the embodiment where SIM/USIM is used as the authentication scheme, integrity protection using the CK/IK as good integrity keys is possible. Therefore, the mobile telephone 1 requests a CK/IK from the SIM/USIM, which generates a second integrity key based on the Ki and the value of the authentication data. Consequently, executing an authentication procedure, such as the GSM authentication procedure, or the UMTS AKA, which per se are believed to be known to the man skilled in the art, provides the CK/IK. As is also understood, the CK of GSM authentication is used as an integrity key correspondingly to the IK of UMTS authentication.

A hashing function, such as SHA-1 or MD5, can be utilized by the mobile telephone 1 for the integrity protection in the alternative embodiment. A value of a MAC parameter is computed as per RFC2104, with SHA-1 as its hashing function. However, other hashing functions may also be used according to the method of the invention. The computation of the MAC value relies upon the use of a shared secret (or key). Therefore, according to the invention, the CK/IK generated by the SIM/USIM is utilized for the integrity protection, as is well known in the art. Also, a HMAC is computed on the entire SyncML-DM/DS message. Each SyncML-DM/DS message is constructed as normal, upon completion of the message the HMAC is computed. The HMAC is located in the header of the transport protocol, e.g. HTTP, WAP, or OBEX, called x-syncml-hmac, during transmission of the message.

When the response is derived, and possibly the MAC and HMAC, the response is incorporated in the data string of the SyncML-DM/DS authentication protocol. Also, the AMI indicates the authentication method used, and the response message is transmitted from the mobile telephone 1 to the server 31, 41, 51, 61 at step 107. Upon reception, the server 31, 41, 51, 61 at step 108 begins the integrity control and finalizes authentication according to the authentication method specified by the AMI.

For finalizing the authentication according to SIM/USIM authentication, the server 31, 41, 51, 61 compares the response value with the value of the stored XRES for authentication control. If integrity protection is provided, the server also generates a MAC value based on the response message and the CK/IK received from the AUC to be compared with the value of the MAC sent in the data string of the SyncML-DM/DS protocol. As integrity protection per se is not an essential part of the invention, the generation of MAC values and the comparing of said values is not further disclosed here.

If USIM authentication is utilized, the mobile telephone 1 may transmit a user authentication reject to the server 31, 41, 51, 61 if the authentication fails, as is indicated in FIG. 5.

In an alternative embodiment, the use of USIM authentication also provides the possibility of server authentication in addition to client authentication. The difference between the embodiment providing server authentication and the embodiments described above is that an additional server authentication variable AUTN (authentication token) is generated by the authentication center in addition to the challenge, CK/IK and XRES. The AUTN variable will be transmitted to the mobile telephone 1 in the data string of the message incorporating the authentication data. Also in this embodiment the AMI is used for indication the type of authentication method utilized. When the mobile telephone 1 receives the AUTN variable, it will pass it on to the USIM, which will perform server authentication in addition to generating the response.

In other embodiments of the invention, other authentication techniques can be utilized, which will be indicated by different AMI values comprised in the message, as set out above. In each embodiment, the authentication data necessary for performing authentication, such as certificates or codes, can be transmitted from the server 31, 41, 51, 61 to the mobile telephone 1 by utilizing the data string of the message sent according to the SyncML-DM/DS protocol.

In the following PKI based WIM authentication and integrity protection will be described briefly. In WIM authentication the initialization message is sent from the mobile telephone 1 to the server 31, 41, 51, 61, correspondingly to SIM/USIM authentication. Then the server determines, if necessary, the capabilities of the mobile telephone, wherein WIM authentication is determined as the authentication method to utilize. Then, the server generates the AMI and a challenge to be transmitted to the mobile telephone according to the same principles as has been described above. When the mobile telephone 1 receives the authentication parameters, i.e. the AMI and the challenge, the mobile telephone 1 transmits the challenge to the WIM of the mobile telephone 1, which as a result generates a response in the form of a certificate, which is stored in the WIM. A certificate authority, as is well known to the man skilled in the art, issues the certificate. The response is then transmitted to the server according to the same principles as in the previous embodiments. The result may be encrypted using a public key of the server. Finally, when the server receives the result, said server will if necessary decrypt the message using the private key of the server 31, 41, 51, 61 and authenticate the response (certificate) by transmitting an authentication request to a certificate authority (CA).

In the authentication procedure, the server 31, 41, 51, 61 will derive the public key of the mobile telephone 1 from the CA. The public key of the mobile telephone may be utilized for providing integrity protection if preferred. If so, the server 31, 41, 51, 61 will generate a good IK based on random numbers, which is incorporated in a message encrypted using the public key of the mobile telephone 1. An hashing algorithm, as described above, is used on the encrypted message, whereupon the message is encrypted with the private key of the mobile telephone. The mobile telephone 1 will receive the encrypted message, decrypt it using the public key of the server, a hashing algorithm, and the private key of the mobile telephone 1 for finalizing the integrity protection.

Other possibilities of integrity protection when WIM based. Authentication are utilized. One example is to provide the encrypted IK together with the challenge in the data string of the first message sent from the server 31, 41, 51, 61 to the mobile telephone 1, which will be incorporated in the data string of the message.

As is mentioned above, also Safeword and SecureId are possible to use as the authentication method. These methods may be used according to the same principles as described in relation to the above embodiments and according to the following dependent and independent claims. Therefore, these authentication methods will not be described in any further detail, as messages will flow between the mobile telephone 1 and the server 31, 41, 51, 61 using the SyncML-DM/DS protocol having a AMI for indicating the authentication method and a data string for carrying any authentication data.

As an option, the authentication data can be used to prevent replay attacks. In 3GPP the server, 31, 41, 51, 61 can e.g. use the equivalent of the AKA FRESH parameter as the value of the authentication data. This value, together with the parameter-nonce count is used for full anti-replay protection.

The method has been described as providing an authentication method indicator (AMI) and utilizing a data string for carrying authentication data, which relates to the specific authentication method used, in a message to be sent according to a synchronization protocol, such as the SyncML-DM/DS protocol. However, it should be noted that the method is not limited to the SyncML-DM/DS protocol. It is equally well possible to implement the method of the invention also below the SyncML layer in transport protocols such as http or Obex.

The invention claimed is:

1. A method for providing authentication when messages are sent between an electronic communication apparatus and a server according to a synchronization protocol in which a plurality of different authentication methods are available, comprising:

providing an authentication method indicator that specifies an authentication method of the plurality of different authentication methods according to which tile authentication is to be executed; wherein the specified authentication method is any of a group comprising Wireless Public Key Infrastructure (WPKI) and Wireless Identity Module (WIM) authentications;

incorporating into a message the authentication method indicator comprising a plurality of authentication capabilities of the communication apparatus among the plurality of different authentication methods;

transmitting said message to said server according to an authentication protocol of the synchronization protocol;

generating, at the server, an integrity key that is encrypted with the public key of the electronic communication apparatus, and an authentication data value comprising an equivalent of an AKA FRESH parameter;

sending the encrypted integrity key and the authentication data value to the electronic communication apparatus;

using the encrypted integrity key at the electronic communication apparatus to generate Message Authentication Code (MAC) values; and using a hashing function at the electronic communication apparatus to compute a Hash-based Message Authentication Code (HMAC) on the message.

2. The method according to claim 1, wherein the authentication method indicator is incorporated into a meta command of the synchronization protocol.

3. The method according to claim 1, wherein the message is an initialization message, and the authentication capabilities of the electronic communication apparatus is indicated in an authentication method list of the initialization message, which is sent to the server for establishing a connection.

4. The method according to claim 3, further comprising:
determining at the server the authentication capabilities of the electronic communication apparatus based on the plurality of authentication capabilities listed in the authentication method list.

5. The method according to claim 4, further comprising:
executing at the server authentication operations according to one of the plurality of authentication capabilities indicated in the authentication method list;
preparing a message at the server comprising the authentication method indicator and any authentication data relating to the specified authentication method; and
transmitting the message to the electronic communication apparatus.

6. The method according to claim 5, further comprising:
receiving the prepared message at the electronic communication apparatus; executing, at the electronic communication apparatus, authentication operations according to the authentication method indicated by the authentication method indicator to generate an expected result;
preparing a response to the server comprising the authentication method indicator, and any authentication data; and
transmitting the response to the server.

7. The method according to claim 1, wherein any authentication data relating to the specified authentication method is incorporated in a data string of the message sent according to the synchronization protocol.

8. The method according to claim 1, wherein the authentication method includes Global System for Mobile communications (GSM) Subscriber Identity Module (SIM) authentication.

9. The method according to claim 1, wherein the authentication method includes Universal Mobile telephone System (UMTS) Universal Subscriber Identity Module (USIM) authentication, which provides server authentication.

10. The method according to claim 1, wherein the authentication method is SecureId or SafeWord authentication.

* * * * *